United States Patent
Stevenson

(10) Patent No.: US 12,436,112 B2
(45) Date of Patent: Oct. 7, 2025

(54) MULTISPECTRAL NONDESTRUCTIVE CHARACTERIZATION OF EDIBLE OBJECTS

(71) Applicant: Lawrence Livermore National Security, LLC, Livermore, CA (US)

(72) Inventor: Garrett Allan Stevenson, Livermore, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 410 days.

(21) Appl. No.: 18/115,735

(22) Filed: Feb. 28, 2023

(65) Prior Publication Data

US 2024/0288382 A1     Aug. 29, 2024

(51) Int. Cl.
    *G01N 22/02*     (2006.01)
    *G01N 33/02*     (2006.01)
    *G06T 7/00*      (2017.01)

(52) U.S. Cl.
    CPC ............. *G01N 22/02* (2013.01); *G01N 33/02* (2013.01); *G06T 7/0004* (2013.01); *G06T 2207/10012* (2013.01); *G06T 2207/10048* (2013.01); *G06T 2207/20081* (2013.01); *G06T 2207/30128* (2013.01)

(58) Field of Classification Search
    CPC ...... G01N 22/02; G01N 33/02; G06T 7/0004; G06T 2207/10012; G06T 2207/10048; G06T 2207/20081; G06T 2207/30128
    See application file for complete search history.

(56) References Cited

U.S. PATENT DOCUMENTS

| | | | | |
|---|---|---|---|---|
| 3,958,078 | A | * | 5/1976 | Fowler ................. G01N 23/043 378/57 |
| 11,704,917 | B2 | * | 7/2023 | Kuo ....................... G01S 13/862 382/110 |
| 2022/0299493 | A1 | * | 9/2022 | Pattison ............. G01N 21/3563 |
| 2023/0029413 | A1 | * | 1/2023 | Lai .......................... G01N 33/02 |

OTHER PUBLICATIONS

Xu, Junyan, et al. "Non-destructive detection of moldy walnuts based on hyperspectral imaging technology." Molecules 27.20 (2022): 6776. (Year: 2022).*

Ricci, Marco, et al. "Microwave sensing for food safety: a neural network implementation." 2021 IEEE Conference on Antenna Measurements & Applications (CAMA). IEEE, 2021. (Year: 2021).*

(Continued)

*Primary Examiner* — Bernarr E Gregory
*Assistant Examiner* — Nazra Nur Waheed
(74) *Attorney, Agent, or Firm* — Perkins Coie LLP

(57) ABSTRACT

A system for characterizing an object that includes an inedible exterior portion and a potentially edible interior portion comprises a computer system and a plurality of sensors configured to acquire data concurrently about the object. The plurality of sensors include a radar system configured to transmit a radar beam to irradiate the object, and to detect a return signal of the radar beam. The computer system is configured to form a radar image of the interior portion of the object based on the return signal, and to characterizing the object based on the acquired data, by applying a machine learning algorithm to the radar image.

37 Claims, 6 Drawing Sheets

(56) References Cited

OTHER PUBLICATIONS

Vasquez, Jorge A. Tobon, et al. "Noninvasive inline food inspection via microwave imaging technology: An application example in the food industry." IEEE Antennas and Propagation Magazine 62.5 (2020): 18-32. (Year: 2020).*

Becker, Florian, et al. "From visual spectrum to millimeter wave: A broad spectrum of solutions for food inspection." IEEE Antennas and Propagation Magazine 62.5 (2020): 55-63. (Year: 2020).*

Becker, F., et al., "From Visual Spectrum to Millimeter Wave," IEEE Antennas & Propagation Magazine, Oct. 2020, 9 pages.

* cited by examiner

400

```
Use a plurality of sensors, including a radar
system, to acquire data concurrently about an
object that includes an inedible exterior portion
and a potentially edible interior portion
401
```

```
Transmit a radar beam from the radar
system to irradiate the object
421
```

```
Detect a return signal of the radar beam,
by the radar system
422
```

```
Form a radar image of the interior portion
of the object based on the return signal
423
```

```
Characterize, by a computer, the object based on
the acquired data
402
```

```
Apply a machine learning algorithm to the
radar image to characterize the object
430
```

FIG. 4

MULTISPECTRAL NONDESTRUCTIVE CHARACTERIZATION OF EDIBLE OBJECTS

STATEMENT REGARDING FEDERALLY SPONSORED RESEARCH

This invention was made with Government support under Contract No. DE-AC52-07NA27344 awarded by the United States Department of Energy. The Government has certain rights in the invention.

FIELD

The present invention generally pertains to automated inspection of objects intended for human consumption, and more particularly, to a technique for multispectral nondestructive characterization of edible objects.

BACKGROUND

Food production in agriculture poses many challenges. These challenges include accurately identifying food items that are damaged, contaminated or that otherwise fail to meet quality standards, without unduly slowing the farm-to-market cycle, and without increasing costs. One area in which this challenge is felt acutely is in the farming and processing of tree nuts, such as walnuts, for example.

In walnut processing, the quality of a large batch of walnuts (e.g., more than 10 tons) is commonly determined by a human expert cracking open the shells of 100-500 walnuts and evaluating the color, weight, and size of the edible portion inside (the "meat"). The human expert also looks for the presence of mold, rancidity, and insects. Shelling walnuts is expensive and therefore is generally only performed for the highest quality of batches as determined by the human expert.

There are several problems with this process. First, shelling and grading this number of walnuts typically takes most of an hour. Additionally, the sample size is not sufficient to determine the quality of the larger batch of walnuts with high accuracy, and the grade given is subject to the human expert's opinion. Hence, the current technique of inspecting walnuts is generally intensive, time-consuming, inefficient and not very accurate.

BRIEF DESCRIPTION OF THE DRAWINGS

One or more embodiments of the present invention are illustrated by way of example and not limitation in the figures of the accompanying drawings, in which like references indicate similar elements.

FIG. 4 illustrates an overall process representing the technique introduced here.

DETAILED DESCRIPTION

Figure 1:
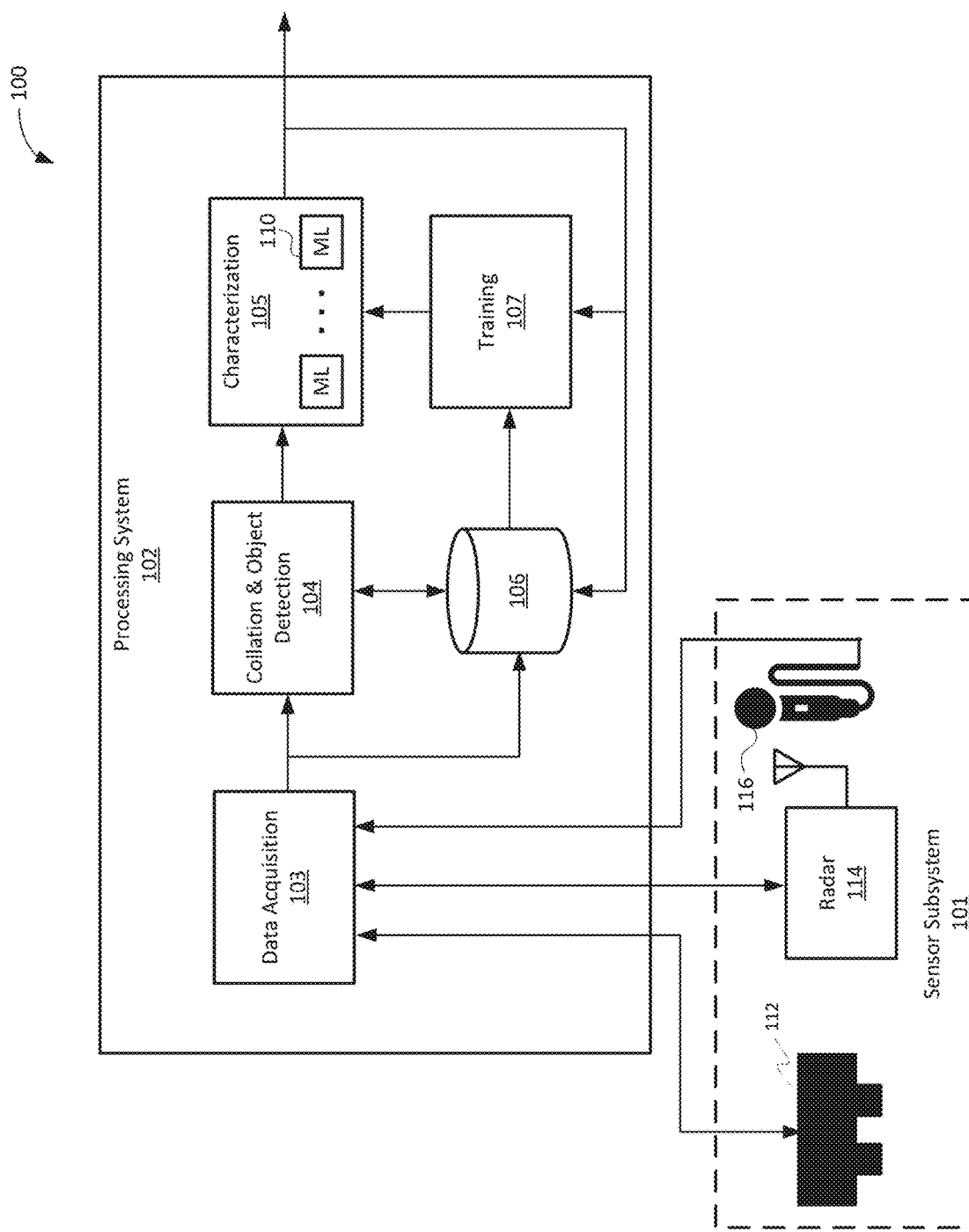
FIG. 1 schematically illustrates an example of an object characterization system.

In this description, references to "an embodiment", "one embodiment" or the like, mean that the particular feature, function, structure or characteristic being described is included in at least one embodiment of the technique introduced here. Occurrences of such phrases in this specification do not necessarily all refer to the same embodiment. On the other hand, the embodiments referred to also are not necessarily mutually exclusive.

Introduced here are a system and corresponding technique for automatically, quickly and efficiently characterizing, large quantities of similar objects that each include an inedible exterior portion surrounding a potentially edible interior portion. The characterization can include, for example, detecting defects in the objects, determining a quality level of each object, sizing each object, etc. The objects can be, for example, in-shell tree nuts, such as walnuts, although the technique introduced here is also potentially applicable to other types of food objects. Further, the technique is also potentially useful for characterizing objects other than food items.

In at least one embodiment, the system includes a computer system coupled to a plurality of sensors spanning different portions of the electromagnetic spectrum, to acquire data about each of the objects to be characterized. In at least one embodiment, the sensors include a millimeter wave radar system configured to illuminate each object with a millimeter wave or terahertz radar beam, and to detect a return signal of the radar beam. The computer system is configured to generate a sequence of frames from the output of the radar system, to form a radar image of the interior portion of each object based on the return signal, and to characterize the object based on the acquired data, by applying one or more machine learning (ML) techniques to the radar image. The ML techniques may be used to characterize objects by using, for example, regression, classification, or both. The sensors may also include one or more shortwave infrared (SWIR) cameras, human-visible light cameras, LIDAR transceivers, microphones, or any combination thereof. The computer system can be configured to collate data about the object acquired from two or more of the sensors. For example, a SWIR camera or stereoscopic visible light camera may be used to track movement of each object across the aperture of the radar, in order to localize the object relative to the radar, determine the size of the object, and calculate the object's trajectory in relation to the radar. The microphone may be used to acquire sound data from the object striking the surface, to which one or more ML algorithms can be applied in order to assess the quality and or other characteristics of the object, either by itself or in conjunction with data from the electromagnetic spectrum sensors.

The system introduced here has a high throughput and accuracy in characterizing (at least) tree nuts, which can cut down evaluation time from approximately 45 minutes in the traditional manual technique to 10-20 minutes, while accurately characterizing tens of thousands of walnuts (e.g., on the order of 1000 times more than a human) in that time.

To facilitate explanation, the following description focuses on a system and technique for characterizing in-shell tree nuts, and particularly walnuts. However, the system and technique are not limited in applicability to walnuts, nor to tree nuts more generally.

Note that as used herein, the term "in-shell tree nut" refers to a whole tree nut, including its shell and edible interior. The term "optical" encompasses visible light and short-wave infrared (SWIR). The term "visible" refers to the portion of the electromagnetic spectrum that is normally visible to humans.

In various embodiments, the system and technique introduced here can characterize in-shell tree nuts according to multiple parameters or categories, including one or more of: kernel weight and/or shrivel, presence of internal mold, type of (internal) mold present (if any), presence of internal moisture, presence of broken shell, presence of internal rot, and presence of internal insects, worms, etc.

In at least one embodiment, the primary sensor employed is a millimeter wave or terahertz radar, which is accompanied by stereoscopic visible light cameras and SWIR cameras. The system may also (or may alternatively) include one or more long-wave infrared (LWIR) cameras, time-of-flight (TOF) cameras, and/or a different type of radar. A large-scale version of the system may employ multiple instances of each type of sensor to span the width of one or several conveyor belts.

In at least one embodiment, the sensor package of the system is statically mounted above a static or moving (e.g., conveyor belt) observation area, and each sensor faces downward toward the observation area at a height of 20-60 cm. The tree nuts to be observed are moved, slid or dropped across the aperture of the sensor package at speeds of approximately 2.5 meters per second. The system utilizes one of the SWIR/optical/TOF cameras to detect and track tree nuts as they move across the sensor package's aperture. The detection and tracking information inform the system of a tree nut's size, speed, location, and need for further characterization. Additionally, the detected and tracked tree nuts can be analyzed for properties such as temperature, broken shell, blackened shell, etc., by using one or more of the SWIR/optical/LWIR cameras.

When a tree nut is detected, tracked, and its initial properties are calculated, the system uses time synchronization to locate the tree nut(s) in frames of the radar image. For example, each sensor's data can be associated with a timestamp from a common clock, so that measurements from each sensor can be time-aligned. The corresponding radar frames are extracted and fed into an object detection algorithm to capture the beginning and end of each tree nut's radar response. The radar response of a tree nut and co-registered images/computed properties from the other sensors are then standardized and pre-processed for input into one or more ML models.

The ML model(s) estimate the kernel weight and color of the in-shell tree nut. Additionally, the model(s) detect the probability of the presence of moisture, mold (and specific types of mold (e.g., white vs. blue/green), insects, rancidity, and shrivel of the kernel.

After the above process is repeated a sufficient number of times (e.g., tens of thousands of times), the system aggregates individual tree nut estimates and performs further processing based on statistical principles, uncertainty quantification, and ML to produce a report to the end-user which characterizes the quality of the larger batch of tree nuts from which the sample nuts were taken.

FIG. 1 schematically illustrates an example of an object characterization system to implement the techniques introduced here. The object characterization system (hereinafter "the system") 100 includes a sensor subsystem 101 and a processing system 102. The sensor subsystem 101 in the illustrated embodiment includes a radar system 114, a camera system 112 and a microphone 116. In at least one embodiment, the radar system 114 is a millimeter wave radar, and more specifically, a frequency-modulated continuous wave (FMCW) radar that operates at high frequencies, such as in the range of 60-81 GHz. This frequency range penetrates tree nut shells and enables receipt of reflections from the matter inside the nut. In at least one embodiment, the camera system 112 includes both a stereoscopic SWIR video camera and a stereoscopic visible-spectrum video camera in a single housing. The SWIR camera is used to acquire data that is used to locate individual objects (e.g., walnuts) in images from the radar. The stereoscopic visible-spectrum video camera operates like human eyes to estimate depth and measure the size of the objects with sub-centimeter accuracy, and to detect externally visible flaws, such as broken shells and rot. The microphone 116 can be essentially any type of microphone that is sensitive to the normal human-audible sound range. In some embodiments, the sensor subsystem can include other sensors, such as a LWIR camera and/or a LIDAR system.

The processing system 102 includes a data acquisition module 103, a collation and object detection module 104, a characterization module 105, a data store 106 and a training module 107. The data acquisition module 103 is responsible for controlling the sensors (112, 114, 116) of the sensor subsystem 101, receiving data generated by the sensors ("sensor data"), and storing the received sensor data in the data store 106. The collation and object detection module 104 is responsible for temporally and spatially collating data from different sensors of the sensor subsystem 101 and for detecting objects (e.g., individual nuts) from the collated data. The characterization module 105 includes one or more machine learning models 110 and is responsible for characterizing detected objects according to various criteria (e.g., size, presence of internal defects, etc.) by use of the machine learning models 110, and for outputting the results of the characterizations to one or more users (which may be or include a human user and/or another computer system or device). The training module 107 is responsible for training the ML models 110 based on an initial training data set and/or subsequent characterization results output by the characterization module 105. The data store 106 stores the sensor data acquired by the data acquisition module 103. Additionally, the data store 106 stores collated data and detected object data from the collation and object detection module 104, and object characterization outputs from the characterization module 105. In some embodiments, the data store 106 may be implemented as multiple physical or logical data stores, e.g., a different data store or data partition may be used for each of the above-mentioned different types of data.

The system 100 can operate in a real-time mode, a batch mode, or both. For example, in some embodiments, the data acquisition module 103 may acquire the sensor data for a batch of walnuts and store it in the data store before any other processing is done to the sensor data. The downstream components of the processing system 102 (e.g., collation and object detection module 104 and characterization module 105) may then process the stored sensor data at a later time to detect and characterize objects. In other embodiments, the data acquisition module 103 may pass the acquired sensor data to the downstream components immediately upon acquisition of that data, for real-time object detection and characterization. Further, training of the ML modules may be done by the training module 107 while the system is on-line in real-time, i.e., using outputs of the characterization module in real-time, or offline based on outputs of the characterization module that have been stored in the data store 106.

Figure 2:
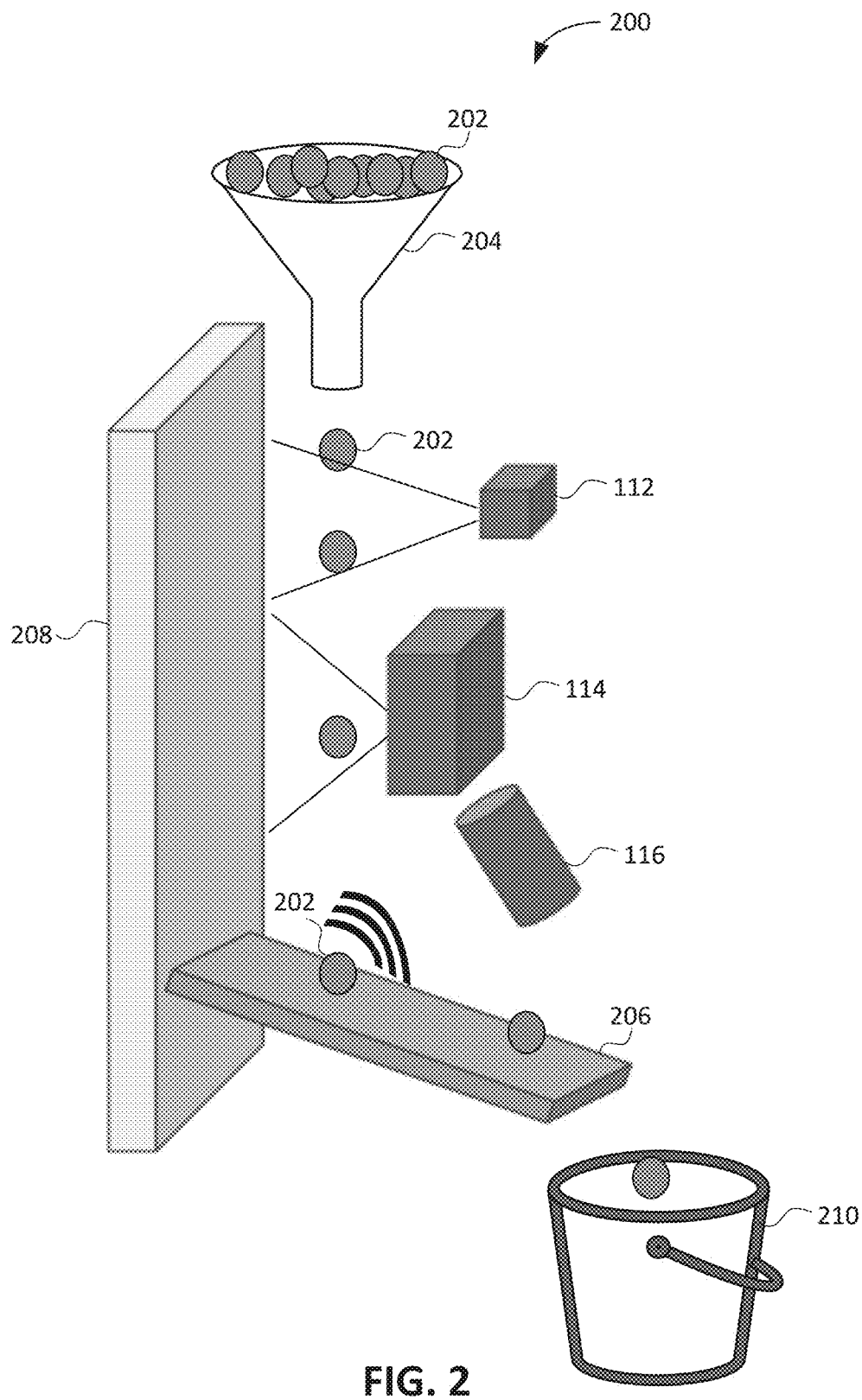
FIG. 2 illustrates an example of a physical set-up for the sensor subsystem, for processing walnuts.

FIG. 2 illustrates an example of a physical set-up 200 for the sensor subsystem, for processing walnuts. The sensor subsystem in the illustrated embodiment includes a millimeter wave radar system 114, a combination stereoscopic SWIR/visible light camera 112 and a microphone 116 (collectively "sensors"). Nuts 202 to be processed are loaded into a funnel 204, from which they are dropped one by one in front of the apertures of the camera 112 and radar 114 and fall onto a ramp 206, from which each nut 202 then rolls downward into a receptacle (e.g., a bucket) 210. The microphone 116 detects the sound of each nut 202 striking the ramp 206. A metal or metal-plated backplate 208 prevents interference by background objects with the radar images and should be at least as wide as the horizontal field of view of the radar.

Figure 3:
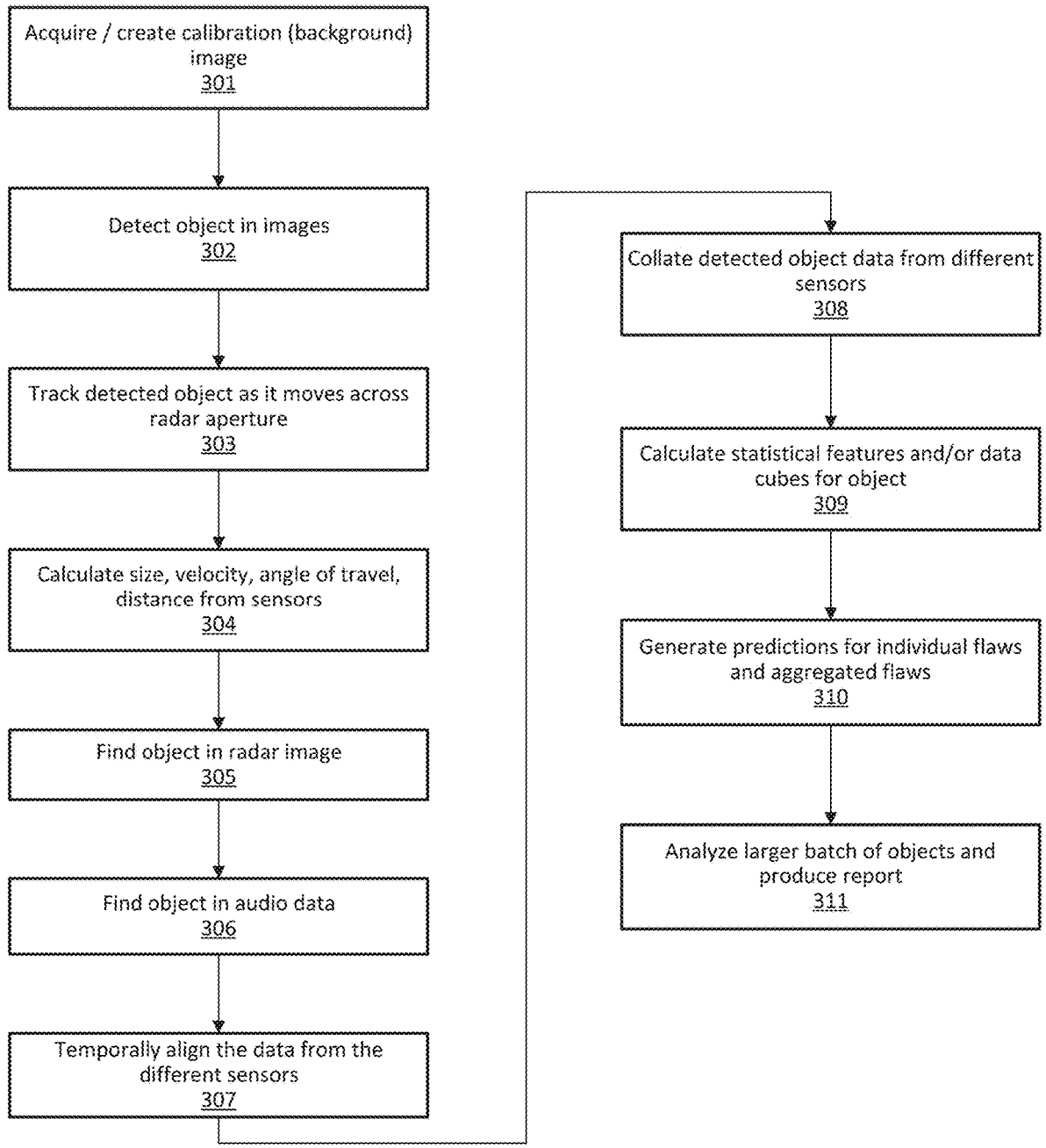
FIG. 3 illustrates an example of a process that can be performed by the processing system to detect and characterize an object based on sensor data from the sensor subsystem.

FIG. 3 illustrates an example of a process that can be performed by the processing system 102 (FIG. 1) to detect and characterize an object, such as a walnut, based on sensor data from the sensor subsystem 101. To facilitate description, the illustrated process 300 is generally expressed in terms of detecting and characterizing a single object (e.g., a single walnut), though it should be recognized that it can be easily adapted to detect and characterize multiple objects concurrently or sequentially.

Initially, the process 300 acquires or creates a calibration (background) image from the SWIR camera at step 301. This can be done, for example, by averaging many images together to create a background image. Next, at step 302 the process detects an object depicted in a series of images from the SWIR camera. To accomplish this, the calibrated background image can be subtracted from every frame of a recording of images from the SWIR camera, and pixels within an expected (reasonable) range can be subjected to a morphological kernel to clean up any single pixel errors or outliers in the SWIR image. The SWIR image can then be limited horizontally to speed up computation and avoid errors. In step 302 according to some embodiments, a binary threshold is then applied to the background image and followed by an Otsu threshold with a given kernel size and range, which produces an image ready for input into a connected component labelling with statistics from OpenCV to detect blob-like regions. This produces labels, statistics, and centroids for objects in the SWIR image.

At step 303 the process tracks the detected object as it progresses across the radar aperture. Each labeled object for a given SWIR image frame is checked against the previous frame/objects to track objects across consecutive frames or create new ones if they are appearing for the first time. The labeled objects are connected to previous frame objects by their centroids and expected movement in the downward (azimuth) direction across the radar system's aperture.

After collecting an object's location and movement through the aperture using SWIR camera data, the object is checked for validity (e.g., to confirm that it shows up for more than one frame and moves as expected), and at step 304 the process calculates the size, velocity, angle of travel, distance from sensors of the object. Visible light/SWIR measurements can also be used to learn how radar response changes with walnut location/size.

Figure 6:
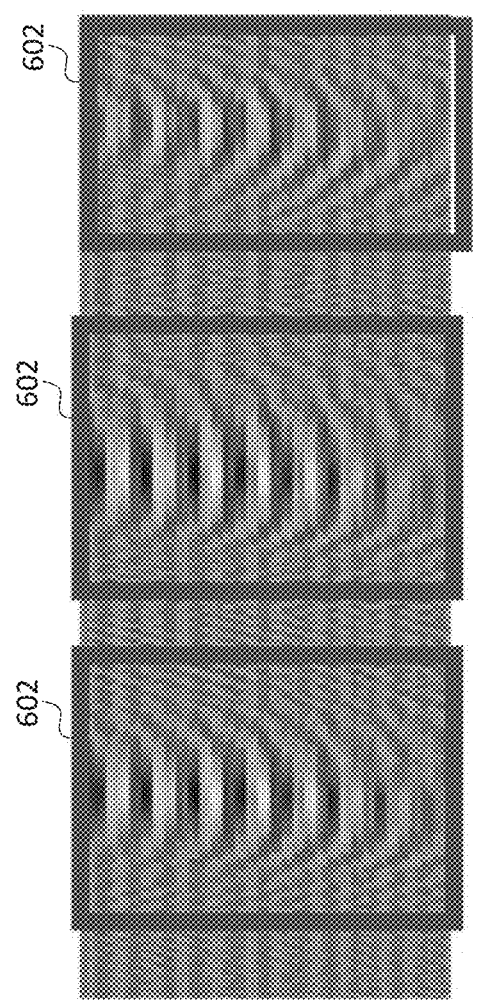
FIG. 6 shows an example of a radar image representing a walnut passing the radar aperture.

At step 305 the process finds the object in the radar image. This operation can be done, for example, by using a custom, threshold-based algorithm, or by an object detection deep learning model (e.g., YOLO v5, Faster RCNN, or new Transformer-based methods). More specifically, multi-static FMCW radar data can be laid out into an image, where "fast-time" (data acquisition time bins representing depth) is on the vertical axis and "slow-time" (normal/clock time) is on the horizontal axis, which thereby shows each object going past the radar as a detectable hyperbola, as shown in FIG. 6. FIG. 6 illustrates an example radar image representing three walnuts passing the radar aperture. To detect the hyperbolas, a deep learning object detection ML can be trained on human-labeled examples and then used to capture new ones. The ML model used for this task can be, for example, YOLO v5 small, but many other plausible model architectures exist and may be usable (e.g., Faster RCNN, Transformer detectors, etc.). The goal is to identify a left and right boundary on the start/end of an object passing the radar aperture. The left and right bounds (denoted by the rectangles 602 in FIG. 6) can then be used to calculate statistics or produce a data cube for input to a convolutional neural network (CNN). The radar data contains phase/amplitude changes that are reflected from whatever is inside the object (e.g., inside the shell of the walnut), and these reflections can be used by ML algorithms to identify and characterize internal features of the nut, including flaws. Tomographic imaging may also be useful here, to raise the signal-to-noise ratio of the radar data and provide even more clear statistical information on the inside of an object.

Referring again to FIG. 3, at step 306 the process finds the object in the audio data acquired from the microphone 116. For the audio data, one could apply a similar technique as with the radar, i.e., use a deep learning-based object detection ML model. Alternatively, and more simply, one can generate a raw time series of the audio data, made into a spectrogram, normalized and thresholded using the number of objects identified from the SWIR camera data to find the loudest wideband peaks, which represent the objects hitting the ramp (see FIG. 2). Audio from at least the initial impact of the object on the ramp 206 (or similar structure), and possibly the subsequent roll of the object, can be used to calculate statistical features, or the spectrogram can be input to an image characterization model (e.g., a CNN) to produce a prediction about whether that object is flawed or not.

At step 307 the process temporally aligns the data acquired from the various different sensors. This could be done by using timestamps and applying time offsets to align the data from the different sensors, or by using a calibration procedure. Further, this can be done on a per-object basis, or on data representing multiple objects. Further, At step 308 the process then collates the data corresponding to the object (the "object data") represented in the temporally-aligned data from the different sensors. At step 309 the process calculates statistical measures and/or data cubes for the object. The statistical measures for each data mode can include, for example, any one or more of the following: maximum, minimum, mean, median, lower quartile, upper quartile, Fisher-Pearson skewness, kurtosis, standard deviation, total variation and singular value decomposition. At step 310 the process generates predictions for individual flaws and aggregated flaws of the object. Finally, at step 311 the process analyzes a larger batch of objects (e.g., a truckload) and produces a report of the results. This may involve using historical information, such as comparing to previously seen truckloads, outlier detection and averaging to characterize the truckload most accurately and/or a comparison to other batches that have been graded recently to give a historic, overall, and recent characterization of a given truckload. In applying the ML models 110, the processing system 102 can use a combination of data modes in amplitude, phase, and frequency to learn/predict various object parameters. Visible light/IR measurements can also be used to learn how radar response changes with walnut location/size.

The ML models 110 can be hyper-parameter optimized by using a Grid Search (scikit-learn), for example. Table 1 shows an example of the types of ML models that can be used (both regression type and binary classification type) to characterize objects (note that this is not intended to be an exhaustive list).

TABLE 1

| Regression | Binary Classification |
| --- | --- |
| Linear Regression | Logistic Regression |
| Lasso LARS | Gaussian Naïve Bayes |
| K-Nearest Neighbors | K-Nearest Neighbors |
| Kernel Ridge Regression | Decision Tree |
| Elastic Net Regression | Quadratic Discriminant Analysis |
| Random Forest | Random Forest |
| Support Vector Machine | Support Vector Machine |
| AdaBoost | AdaBoost |
| Neural Network | Neural Network |
| Bagged Regressors | Bagged Regressors |

In at least one embodiment, for any particular characteristic, a particular ML model may be more effective than others in analyzing an object. Table 2 indicates certain ML models that may be advantageous for identifying certain internal characteristics in walnuts:

TABLE 2

| Characteristic | ML Model |
| --- | --- |
| Kernel Weight | Support Vector Machine |
| Any Internal Flaw | Convolutional Neural Network |
| White Mold | Random Forest |
| Blue/Green Mold | Random Forest |
| Moisture | Random Forest |
| Shrivel | Random Forest |
| Insect | Gaussian Naïve Bayes |
| Rot | Random Forest |

Although rot is primarily an external characteristic that can be detected using data from the visible-spectrum camera, in cases where the rot is internal, it can be detected using the radar data in combination with an ML model, as indicated in Table 2. Similarly, broken shells are primarily an external flaw to be detected using data from the visible-spectrum camera. However, if the broken part of the shell is facing away from the camera, it cannot be detected in that way. In such cases, radar data in combination with an ML model, such as a Bagged Support Vector Machine, may be used for that purpose.

FIG. 4 illustrates an overall process 400 representing the technique introduced here, according to at least embodiment of the technique introduced here. At step 401 the process 400 uses a plurality of sensors, including a radar system, to acquire data concurrently about an object that includes an inedible exterior portion and a potentially edible interior portion. Step 401 includes step 421, in which the process transmit a radar beam from the radar system to irradiate the object, step 422 in which the process detects, by the radar system, a return signal of the radar beam, and step 423 in which the process forms a radar image of the interior portion of the object based on the return signal. Then, at step 402 the process characterizes, by a computer, the object based on the acquired data, wherein the characterization includes (step 430) applying a machine learning algorithm to the radar image to characterize the object.

Figure 5:
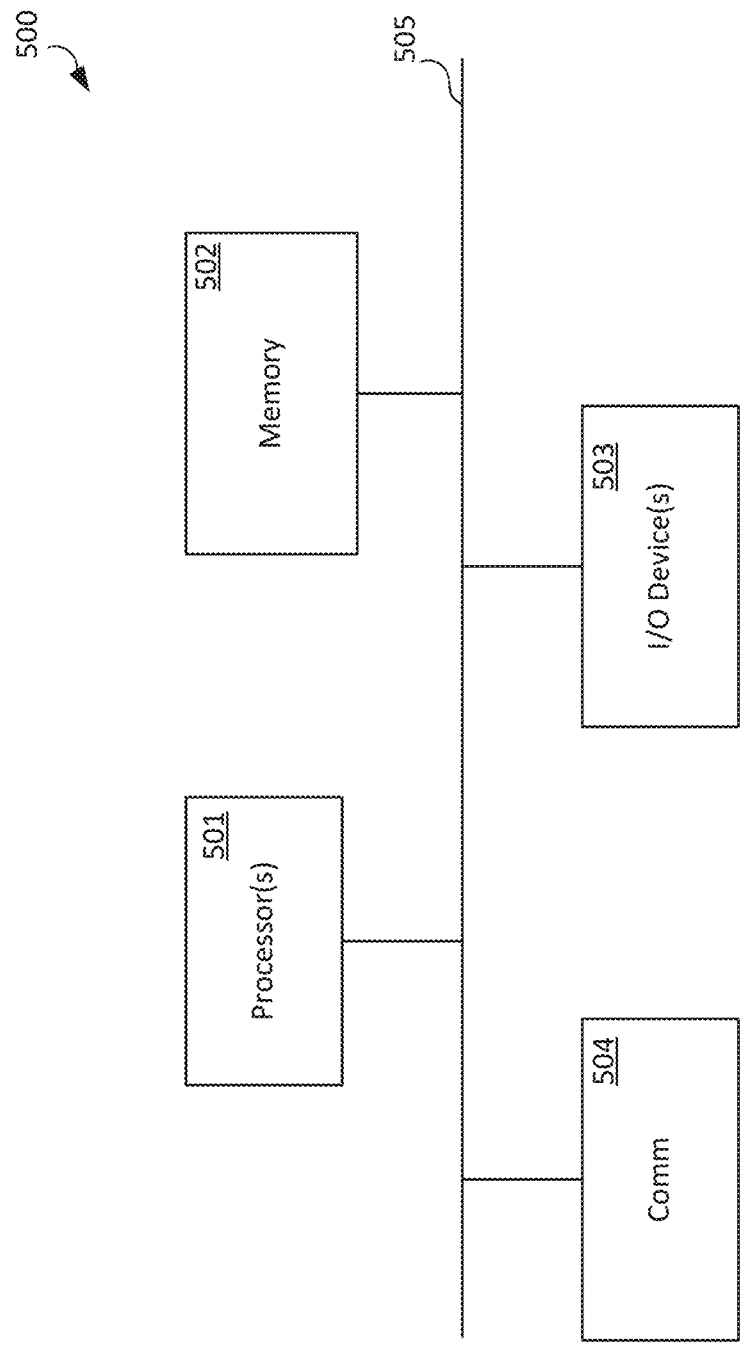
FIG. 5 is a block diagram illustrating an example of a computer system in which at least some aspects of the technique introduced here can be implemented.

FIG. 5 is a block diagram illustrating an example of a computer system 500 in which at least some aspects of the technique introduced here can be implemented, including, for example, the object detection and characterization steps represented in FIGS. 3 and 4.

The computer system 500 includes one or more processors 501, one or more memories 502, one or more input/output (I/O) devices 503, and one or more communication interfaces 504, all connected to each other through an interconnect 505. The processor(s) 501 control the overall operation of the computer system 100, including controlling its constituent components. The processor(s) 501 may be or include one or more conventional microprocessors, programmable logic devices (PLDs), field programmable gate arrays (FPGAs), application-specific integrated circuits (ASICs), etc. The one or more memories 502 store data and executable instructions (e.g., software and/or firmware), which may include software and/or firmware for performing the techniques introduced above. The one or more memories 502 may be or include any of various forms of random access memory (RAM), read-only memory (ROM), volatile memory, nonvolatile memory, or any combination thereof. For example, the one or more memories 502 may be or include dynamic RAM (DRAM), static RAM (SDRAM), flash memory, one or more disk-based hard drives, etc. The I/O devices 503 provide access to the computer system 500 by human user, and may be or include, for example, a display monitor, audio speaker, keyboard, touch screen, mouse, microphone, trackball, etc. The communications interface 504 enables the computer system 500 to communicate with one or more external devices (e.g., one or more servers and/or clients of the computer system 500) via a network connection and/or direct connection. The communications interface 504 may be or include, for example, a Wi-Fi adapter, Bluetooth adapter, Ethernet adapter, Universal Serial Bus (USB) adapter, or the like. The interconnect 505 may be or include, for example, one or more buses, bridges or adapters, such as a system bus, peripheral component interconnect (PCI) bus, PCI extended (PCI-X) bus, USB, or the like.

Unless contrary to physical possibility, it is envisioned that (i) the methods/steps described herein may be performed in any sequence and/or in any combination, and that (ii) the components of respective embodiments may be combined in any manner.

The machine-implemented computational and control operations described above can be implemented by programmable circuitry programmed/configured by software and/or firmware, or entirely by special-purpose circuitry, or by a combination of such forms. Such special-purpose circuitry (if any) can be in the form of, for example, one or more application-specific integrated circuits (ASICs), programmable logic devices (PLDs), field-programmable gate arrays (FPGAs), system-on-a-chip systems (SOCs), etc.

Software or firmware to implement the techniques introduced here may be stored on a machine-readable storage medium and may be executed by one or more general-purpose or special-purpose programmable microprocessors. A "machine-readable medium", as the term is used herein, includes any mechanism that can store information in a form accessible by a machine (a machine may be, for example, a computer, network device, cellular phone, personal digital assistant (PDA), manufacturing tool, any device with one or more processors, etc.). For example, a machine-accessible medium includes recordable/non-recordable media (e.g., read-only memory (ROM); random access memory (RAM); magnetic disk storage media; optical storage media; flash memory devices; etc.), etc.

Any or all of the features and functions described above can be combined with each other, except to the extent it may be otherwise stated above or to the extent that any such embodiments may be incompatible by virtue of their function or structure, as will be apparent to persons of ordinary skill in the art. Unless contrary to physical possibility, it is envisioned that (i) the methods/steps described herein may be performed in any sequence and/or in any combination, and that (ii) the components of respective embodiments may be combined in any manner.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:
a plurality of sensors, including:
a radar system, configured to acquire data concurrently about an object that includes an inedible exterior portion and a potentially edible interior portion, the radar system being configured to transmit a radar beam from the radar system to irradiate the object, and to detect a return signal of the radar beam; and
an optical sensor configured to acquire optical data of the object; and
a computer system coupled to the plurality of sensors and configured to use the optical data to localize the object relative to an aperture of the radar system and to calculate a trajectory of the object in relation to the aperture of the radar system and form a radar image of the interior portion of the object based on the return signal, and to characterize the object based on the acquired data, wherein characterizing the object includes applying a machine learning algorithm to the radar image to characterize the object.

2. A system as recited in claim 1, wherein characterizing the object comprises determining whether a defect is present in the object.

3. A system as recited in claim 1, wherein characterizing the object comprises using the machine learning algorithm to characterize the interior portion of the object.

4. A system as recited in claim 1, wherein the computer system is further configured to collate data about the object acquired from the plurality of sensors.

5. A system as recited in claim 4, wherein collating the data comprises using data from a second sensor, of the plurality of sensors, to locate the object in the radar image.

6. A system as recited in claim 1, wherein the radar system is a millimeter wave or terahertz radar system.

7. A system as recited in claim 1, wherein the optical sensor comprises a short-wave infrared (SWIR) camara.

8. A system as recited in claim 1, wherein the optical sensor comprises a stereoscopic human-visible light camara.

9. A system as recited in claim 1, wherein the plurality of sensors further includes an optical sensor, and wherein the computer system is further configured to use an output of the optical sensor to determine a size of the object.

10. A system as recited in claim 1, wherein:
the plurality of sensors include a microphone; and
the computer system is further configured to use the microphone to acquire sound data of a sound of the object impacting a surface, and to use the sound data to determine a quality of the object.

11. A system as recited in claim 1, wherein characterizing the object comprises identifying a presence of mold in the interior portion of the object.

12. A system as recited in claim 1, wherein characterizing the object comprises identifying a type of mold present in the interior portion of the object.

13. A system as recited in claim 1, wherein characterizing the object comprises identifying a presence of a worm or insect in the interior portion of the object.

14. A system as recited in claim 1, wherein characterizing the object comprises identifying a presence of rot in the interior portion of the object.

15. A system comprising:
a millimeter wave or terahertz radar system configured to acquire data about an object that includes an inedible exterior portion and a potentially edible interior portion, the radar system being configured to transmit a radar beam from the radar system to irradiate the object, and to detect a return signal of the radar beam;
an optical sensor to acquire optical data of the object concurrently with the radar system transmitting the radar beam or detecting the return signal; and
a computer system coupled to the plurality of sensors and configured to form a radar image of the interior portion of the object based on the return signal, and to characterize the object based on the acquired data, wherein characterizing the object includes
using the optical data to determine a location of the object in the radar image, and
applying a machine learning algorithm to the radar image, based on the determined location of the object, to detect a defect in the interior portion of the object.

16. A system as recited in claim 15, wherein the optical sensor comprises a short-wave infrared (SWIR) camara.

17. A system as recited in claim 15, wherein the optical sensor comprises a stereoscopic human-visible light camara.

18. A system as recited in claim 15, wherein the computer system is further configured to use an output of the optical sensor to determine a size of the object.

19. A system as recited in claim 15, wherein the plurality of sensors further include a microphone, and the computer system is further configured to use the microphone to acquire sound data of a sound of the object impacting a surface, and to use the sound data to determine a quality of the object.

20. A system as recited in claim 15, wherein characterizing the object comprises identifying a presence of mold in the interior portion of the object.

21. A system as recited in claim 15, wherein characterizing the object comprises identifying a type of mold present in the interior portion of the object.

22. A system as recited in claim 15, wherein characterizing the object comprises identifying a presence of a worm or insect in the interior portion of the object.

23. A system as recited in claim 15, wherein characterizing the object comprises identifying a presence of rot in the interior portion of the object.

24. A machine-implemented method comprising:
using a plurality of sensors, including a radar system, to acquire data concurrently about an object that includes an inedible exterior portion and a potentially edible interior portion, wherein using the plurality of sensors includes:
- using an optical sensor to acquire optical data of the object,
- using the optical data to localize the object relative to an aperture of the radar system and to calculate a trajectory of the object in relation to the aperture of the radar system,
- transmitting a radar beam from the radar system to irradiate the object,
- detecting a return signal of the radar beam, by the radar system, and
- forming a radar image of the interior portion of the object based on the return signal; and
- characterizing, by a computer, the object based on the acquired data, wherein the characterizing includes applying a machine learning algorithm to the radar image to characterize the object.

25. A method as recited in claim 24, wherein characterizing the object comprises determining whether a defect is present in the object.

26. A method as recited in claim 24, wherein characterizing the object comprises using the machine learning algorithm to characterizing the interior portion of the object.

27. A method as recited in claim 24, further comprising: collating data about the object acquired from the plurality of sensors.

28. A method as recited in claim 27, wherein collating the data comprises using data from a second sensor, of the plurality of sensors, to locate the object in the radar image.

29. A method as recited in claim 24, wherein the radar system is a millimeter wave or terahertz radar system.

30. A method as recited in claim 24, wherein the optical sensor comprises a short-wave infrared (SWIR) camara.

31. A method as recited in claim 24, wherein the optical sensor comprises a stereoscopic human-visible light camara.

32. A method as recited in claim 24, wherein using the plurality of sensors further includes:
- using the optical image data to determine a size of the object.

33. A method as recited in claim 24, wherein:
- the plurality of sensors include a microphone;
- using the plurality of sensors comprises using the microphone to acquire sound data of a sound of the object impacting a surface; and
- characterizing the object includes using the sound data to determine a quality of the object.

34. A method as recited in claim 24, wherein characterizing the object comprises identifying a presence of mold in the interior portion of the object.

35. A method as recited in claim 24, wherein characterizing the object comprises identifying a type of mold present in the interior portion of the object.

36. A method as recited in claim 24, wherein characterizing the object comprises identifying a presence of a worm or insect in the interior portion of the object.

37. A method as recited in claim 24, wherein characterizing the object comprises identifying a presence of rot in the interior portion of the object.

* * * * *